US009502872B2

(12) United States Patent
Shiraki

(10) Patent No.: US 9,502,872 B2
(45) Date of Patent: Nov. 22, 2016

(54) ELECTRICAL JUNCTION BOX

(71) Applicant: SUMITOMO WIRING SYSTEMS, LTD., Yokkaichi, Mie (JP)

(72) Inventor: Takashi Shiraki, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 14/652,549

(22) PCT Filed: Dec. 6, 2013

(86) PCT No.: PCT/JP2013/082887
§ 371 (c)(1),
(2) Date: Jun. 16, 2015

(87) PCT Pub. No.: WO2014/109155
PCT Pub. Date: Jul. 17, 2014

(65) Prior Publication Data
US 2015/0318676 A1 Nov. 5, 2015

(30) Foreign Application Priority Data
Jan. 8, 2013 (JP) ................. 2013-000821

(51) Int. Cl.
H02G 3/08 (2006.01)
B60R 16/023 (2006.01)

(52) U.S. Cl.
CPC ............. *H02G 3/08* (2013.01); *B60R 16/0238* (2013.01)

(58) Field of Classification Search
CPC .......... H02G 3/08; H02G 3/081; H02G 3/16; H05K 7/14; H05K 7/00; H05K 5/04; H05K 5/00; H05K 5/02; H05K 5/0204; H05K 5/0217; H05K 5/0221; B60R 16/02; B60R 16/0238

USPC ......... 174/50, 559; 439/76.1, 76.2; 248/201, 248/906, 200
See application file for complete search history.

(56) References Cited

U.S. PATENT DOCUMENTS 6,172,299 B1 * 1/2001 Miyakoshi ........... H05K 5/0204
174/535
6,833,503 B2 * 12/2004 Lopez ................. B60R 16/0238
174/50

(Continued)

FOREIGN PATENT DOCUMENTS

JP 2010-178474 A 8/2010
JP 2010-268601 A 11/2010
JP 2010-283933 A 12/2010

OTHER PUBLICATIONS

Feb. 4, 2014 International Search Report issued in International Application No. PCT/JP2013/082887.

*Primary Examiner* — Angel R Estrada
(74) *Attorney, Agent, or Firm* — Oliff PLC

(57) ABSTRACT

An electrical junction box, wherein as one set of the fitting portions provided at the plurality of locations, lock portions for being engaged with each other are formed in the box body and the external member, respectively; and as one set of the fitting portions provided at the plurality of locations, an engaging guide rib is formed in one of the box body and the external member, the engaging guide rib protruding from a wall surface of the box body or the external member so as to extend in a direction in which the external member is fitted to the box body and including locking portions that extend in opposite directions orthogonal to a direction of extension of the engaging guide rib, and an engaging guide groove for being engaged with the engaging guide rib is formed in the other of the box body and the external member.

5 Claims, 8 Drawing Sheets

(56) References Cited

U.S. PATENT DOCUMENTS

| | | | |
|---|---|---|---|
| 7,459,631 B2 * | 12/2008 | Nakayama | H05K 5/0204 174/50 |
| 7,903,395 B2 * | 3/2011 | Nishida | H05K 5/0204 361/679.01 |
| 8,420,931 B2 * | 4/2013 | Soh | B60R 16/0238 174/50 |
| 9,203,221 B2 * | 12/2015 | Kamigaichi | H02G 3/08 |
| 9,231,330 B2 * | 1/2016 | Tashiro | B60R 16/0238 |
| 2010/0300722 A1 * | 12/2010 | Kita | B60R 16/0238 174/50 |
| 2012/0119041 A1 | 5/2012 | Ikehata | |

* cited by examiner

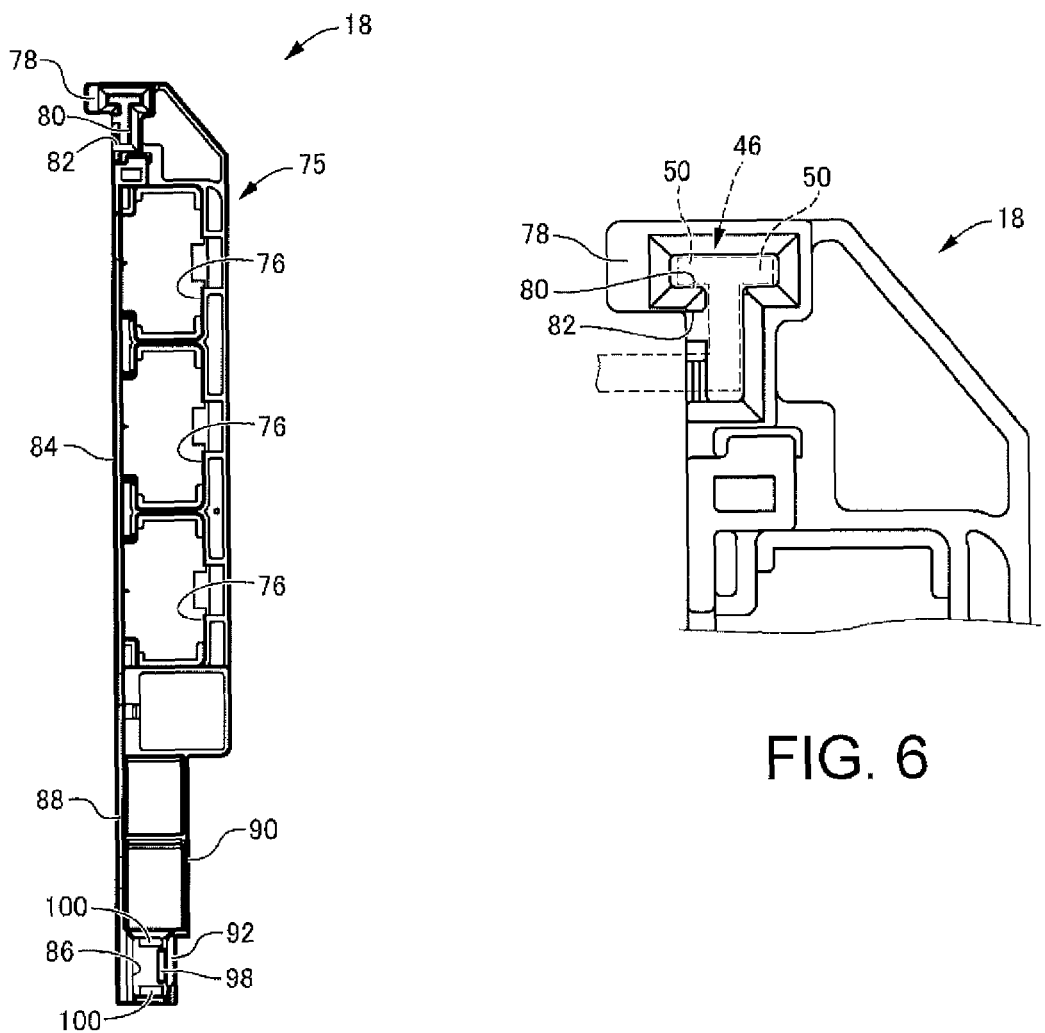
FIG. 5
FIG. 6
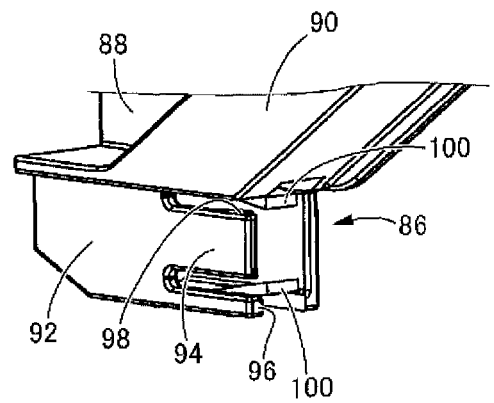
FIG. 7

ELECTRICAL JUNCTION BOX

This is a national phase application of PCT/JP2013/082887 filed on Dec. 6, 2013. This application claims priority to Japanese Application Number JP2013-000821, which was filed in the Japanese Patent Office on Jan. 8, 2013. The entire contents of which are incorporated by reference herein.

BACKGROUND

The present disclosure relates to an electrical junction box that is attached to a vehicle such as an automobile, and particularly to an electrical junction box in which an external member separate from a box body is mounted on the box body with fitting portions provided at a plurality of locations.

Electrical junction boxes have hitherto been used, for example, for efficiently routing electrical wiring or efficiently arranging electric components such as a fuse, a relay, and the like in automobiles and the like. Such electrical junction boxes include an electrical junction box in which an external member such as a bracket formed separately from a box body is mounted on the box body, as described in JP 2010-268601A.

When the external member is a large member, such as the bracket described in JP 2010-268601A, that spans across substantially the entire length of the box body, it is necessary to fix the external member to the box body at a plurality of locations. For this reason, in the box body described in JP 2010-268601A, fitting portions are formed in two locations (one of which corresponds to the bracket attached to the box body) positioned diagonally across from each other on the box body, and the bracket is fixed at the two fitting portions.

However, in the electrical junction box described in JP 2010-268601A, the corresponding two fitting portions provided in the bracket need to be simultaneously fitted to the two fitting portions in the box body. Therefore, the alignment of the two fitting portions must be performed simultaneously, making the mounting operation difficult. Particularly, in recent years, consideration is being given to further fix an external member such as a connector holder to a vehicle fixing member such as a bracket attached to the box body as a separate member. In such a case, there is the possibility that tolerances of the box body and the vehicle fixing member are accumulated, making it more difficult to perform the alignment of the plurality of fitting portions simultaneously.

SUMMARY

The present disclosure has been made in light of the above-described circumstances, and a problem to be solved by the disclosure is to provide an electrical junction box having a novel structure capable of more easily mounting an external member to a box body in an electrical junction box in which the external member formed separately from the box body is attached to the box body with fitting portions provided at a plurality of locations.

A first aspect of the present disclosure is directed to an electrical junction box configured such that an external member formed separately from a box body is mounted to the box body with fitting portions provided at a plurality of locations, wherein: as one set of the fitting portions provided at the plurality of locations, lock portions for being engaged with each other are formed in the box body and the external member, respectively; as one set of the fitting portions provided at the plurality of locations, an engaging guide rib is formed in one of the box body and the external member, the engaging guide rib protruding from a wall surface of the box body or the external member so as to extend in a direction in which the external member is fitted to the box body and including locking portions that extend in opposite directions orthogonal to a direction of extension of the engaging guide rib, and an engaging guide groove for being engaged with the engaging guide rib is formed in the other of the box body and the external member; and the lock portions are engaged after the engaging guide rib and the engaging guide groove are engaged.

In the electrical junction box having a structure according to the present disclosure, the engaging guide rib and the engaging guide groove are engaged before the lock portions in the box body and the external member are engaged. Accordingly, it is possible to guide the external member by using the engaging guide rib and the engaging guide groove to the box body in the mounting direction, and to position the external member relative to the box body before the lock portions are engaged, thus aligning the lock portions in the box body and the external member with each other. As a result, it is possible to readily engage the lock portions, thus further facilitating the assembling operation.

In particular, the locking portions that extend in opposite directions orthogonal to the direction of extension are formed in the engaging guide rib. Accordingly, it is possible to engage the locking portions with the inner surface of the engaging guide groove, thus maintaining the engaged state between the engaging guide rib and the engaging guide groove and preventing detachment of the external member from the box body. It is also possible to position the external member relative to the box body in a more stable manner, thus accurately aligning the lock portions of the external member and the box body.

Note that various shapes including, for example, a shape having a T-shaped cross section or a cross-shaped cross section, a shape having an inverted triangular cross section that expands in the direction of protrusion from the wall surface of the box body or the external member, can be used as the shape of the engaging guide rib. There is no limitation on the external member as long as it is formed separately from the box body and can be mounted on the box body. For example, the external member may be a connector holder holding a connector, an electrical junction box such as a relay box to which a relay is attached, or a bracket or the like for attaching the box body to a vehicle body. Furthermore, various shapes may be used for the specific structure of the lock portions as well.

A second aspect of the present disclosure is directed to the electrical junction box according to the first aspect, wherein the fitting portions in the box body are provided in a vehicle fixing member that is formed separately from the box body and that is mounted on the box body.

In the present aspect, the external member is mounted on the vehicle fixing member mounted on the box body, and is mounted on the box body via the vehicle fixing member. In such a case, there is the possibility that tolerances of the box body and the vehicle fixing member may accumulate, thus making alignment of the lock portions of the external member and the box body more difficult. However, according to the present disclosure, the lock portions can be aligned by engaging the engaging guide rib with the engaging guide groove, and therefore, favorable assembling workability can be ensured.

A third aspect of the present disclosure is directed to the electrical junction box according to the first or second aspect, wherein the box body has a longitudinal shape, and the engaging guide rib or the engaging guide groove is provided on one side in a longitudinal direction of the box body, and the lock portions are provided on another side in the longitudinal direction of the box body.

In the present aspect, the external member is attached to the box body with the fitting portions provided on opposite longitudinal sides of the box body, and therefore, the external member can be mounted on the box body in a stable manner. On the other hand, due to a large separation distance between the fitting portions, it may be difficult to align the lock portion in the box body with the lock portion in the external member. However, the lock portions can be aligned by engaging the engaging guide rib with the engaging guide groove before engagement of the lock portions, and therefore, assembly can be readily performed even if the separation distance between the plurality of fitting portions is large.

Note that the present aspect can be used in combination with the second aspect. In other words, for example, the vehicle fixing members may be attached to opposite longitudinal sides of the box body, with one of the vehicle fixing members provided with the engaging guide rib or the engaging guide groove, and the other vehicle fixing member provided with the lock portions.

A fourth aspect of the present disclosure is directed to the electrical junction box according any one of the first to third aspects, wherein the lock portions are engaged after the engaging guide groove is fitted to a length dimension greater than or equal to ⅓ of a length dimension of the engaging guide rib.

According to the present aspect, the engagement of the lock portions is started after the positioning between the lock portion in the box body and the lock portion in the external member is stabilized as a result of the engaging guide rib and the engaging guide groove being engaged by a predetermined amount. Accordingly, the engagement between the lock portions can be performed more smoothly.

A fifth aspect of the present disclosure is directed to the electrical junction box according to any one of the first to fourth aspects, wherein the lock portions include an insertion protruding portion provided in one of the box body and the external member, and an insertion recessed portion provided in the other of the box body and the external member, the insertion recessed portion being configured such that the insertion protruding portion is inserted thereinto and engaged therewith, the insertion recessed portion is provided with a tolerance absorbing device configured to be pressed by the insertion protruding portion and be elastically deformable in a direction orthogonal to a direction in which the insertion protruding portion is inserted, and the insertion protruding portion is inserted into the insertion recessed portion after the engaging guide rib and the engaging guide groove are engaged.

In the present aspect, the external member is attached to the box body by engaging the insertion protruding portion provided in one of the box body and the external member with the insertion recessed portion provided in the other of the box body and the external member by inserting the insertion protruding portion into the insertion recessed portion. Then, the tolerance absorbing device is elastically deformed upon insertion of the insertion protruding portion into the insertion recessed portion, thereby making it possible to absorb variations in the positions of the insertion protruding portion relative to the insertion recessed portion, and stably support the insertion protruding portion within the insertion recessed portion by the elastic restoring force of the tolerance absorbing device. Accordingly, it is possible to absorb the tolerances of the box body and the external member, and stably attach the external member to the box body without rattling. In particular, when the insertion recessed portion or the insertion protruding portion is provided in the vehicle fixing member attached to the box body in the case of using the present aspect in combination with the second aspect, accumulated tolerances of the box body, the vehicle fixing member, and the external member can be effectively absorbed by the tolerance absorbing device, and the external member can be attached to the box body in a stable manner. As a result, it is possible to effectively prevent generation of unusual sound caused by rattling of the external member.

Then, the insertion protruding portion can be aligned with and inserted into the insertion recessed portion by positioning the external member relative to the box body by engaging the engaging guide rib with the engaging guide groove before the insertion protruding portion is inserted into the insertion recessed portion. As a result, the engagement of the lock portions composed of the insertion protruding portions and the insertion recessed portions can be performed more easily, making it possible to achieve excellent assembling workability.

Note that the tolerance absorbing device may be formed, for example, by housing a separate elastic member such as a rubber elastomer or a metal spring in the insertion recessed portion, or may be formed integrally with the insertion recessed portion, for example, by forming the wall portion of the insertion recessed portion in the shape of a plate spring.

In the present disclosure, the lock portions are provided as one set of the plurality of fitting portions for attaching the external member to the box body, and the engaging guide rib and the engaging guide groove for being engaged with each other are provided as one set of the plurality of fitting portions, and the lock portions are engaged after the engaging guide rib and the engaging guide groove are engaged. This makes it possible to position the external member relative to the box body by engaging the engaging guide rib and the engaging guide groove before engagement of the lock portions. As a result, the lock portions in the box body and the external member can be aligned and engaged with each other, thus further facilitating attachment of the external member to the box body and improving assembling workability.

BRIEF DESCRIPTION OF THE DRAWINGS

FIG. 5 is a side view of the connector holder.

FIG. 6 is an enlarged side view of relevant portions of the connector holder.

FIG. 7 is an enlarged perspective view of relevant portions of the connector holder that are different from those shown in FIG. 6.

DETAILED DESCRIPTION OF THE EMBODIMENTS

Hereinafter, embodiments of the present disclosure will be described with reference to the drawings.

Figure 1:
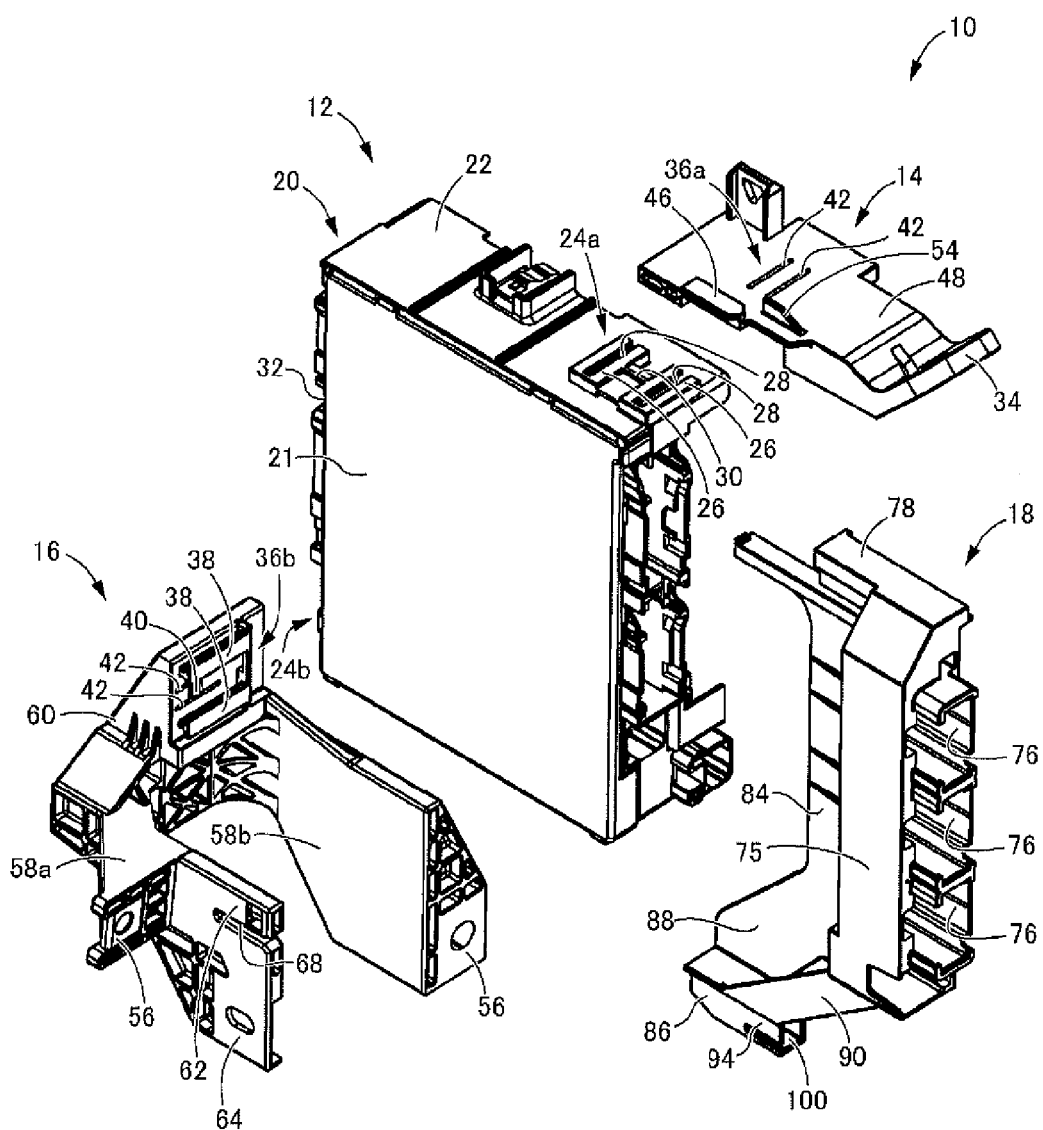
FIG. 1 is an exploded perspective view of an electrical junction box as a first embodiment of the present disclosure.
Figure 2:
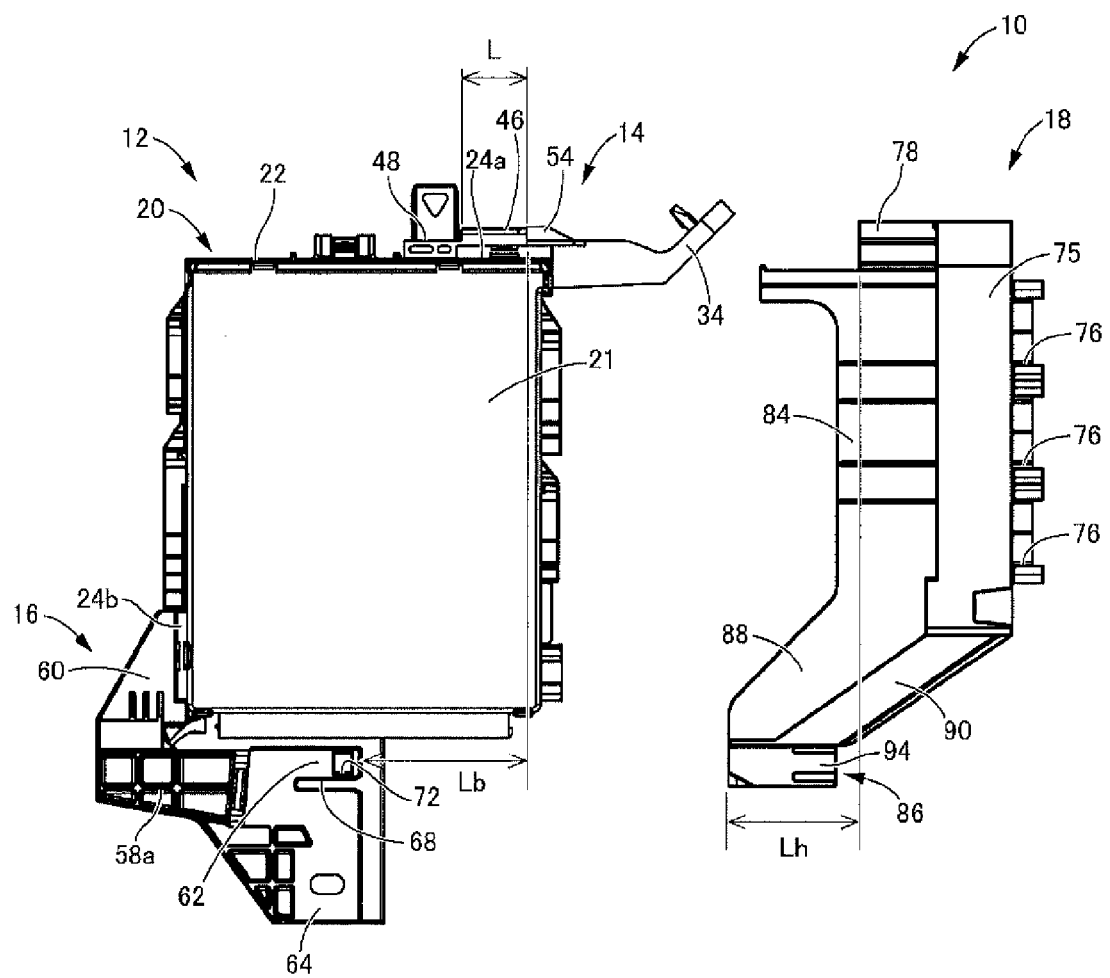
FIG. 2 is a front view of a box body and a connector block shown in FIG. 1.

First, an electrical junction box 10 as a first embodiment of the present disclosure is shown in FIGS. 1 and 2. The electrical junction box 10 includes a box body 12, an upper fixing member 14 and a lower fixing member 16 as vehicle fixing members that are attached to the box body 12, and a connector holder 18 as an external member that is attached to the upper fixing member 14 and the lower fixing member 16. Note that FIG. 2 shows a state in which the upper fixing member 14 and the lower fixing member 16 have been attached to the box body 12. In the following description, "up-down direction" refers to the up-down direction in FIG. 2, or in other words, the vertical up-down direction in a state in which the electrical junction box 10 is attached to a vehicle.

The box body 12 has a structure in which a printed-circuit board, a bus bar and the like, which are not shown, are provided in the interior of a case 20 made of a synthetic resin. The case 20 has the shape of a substantially elongated rectangular box, and is disposed with the longitudinal direction of the case 20 aligned in the vertical up-down direction in a state in which the electrical junction box 10 is attached to the vehicle. Substantially the entire front surface 21 of the case 20 is flat.

A receiving lock 24a is formed on an upper wall 22 of the case 20. The receiving lock 24a includes a pair of guide tube portions 26 and 26. The guide tube portions 26 and 26 have a substantially rectangular tubular shape extending along the upper wall 22 in the thickness direction of the box body 12, and are formed so as to be parallel to each other with an interval therebetween. The guide tube portions 26 and 26 have a substantially bottomed tubular shape having one end open, and slots 28 and 28 are formed so as to extend from the open end. Also, a lock wall portion 30 extending in a direction in which the guide tube portions 26 and 26 are coupled is formed between the guide tube portions 26 and 26 at a position that is in an intermediate portion in the direction of extension of the guide tube portions 26 and 26.

The receiving lock 24a is provided at an end portion of the upper wall 22 on one side (in FIG. 2, the right side) in the shorter direction (in FIG. 2, the left-right direction) of the box body 12. In addition, a receiving lock 24b (see FIG. 2) is formed on a side wall 32 of the case 20. The receiving lock 24b has the same structure as the receiving lock 24a, and therefore, the description thereof has been omitted. The receiving lock 24b is provided at a lower end portion, which is located on the opposite side to the upper wall 22, of the side wall 32 in the longer direction (in FIG. 2, the up-down direction) of the box body 12.

The upper fixing member 14 is an integrally molded, synthetic resin unit formed separately from the box body 12. The upper fixing member 14 is substantially plate-shaped as a whole, and a bolt fixing portion 34 having a bolt hole extending therethrough is integrally formed with the upper fixing member 14 so as to protrude therefrom.

An inserting lock 36a is formed in the upper fixing member 14. The inserting lock 36a has the same structure as an inserting lock 36b of the lower fixing member 16, which will be described later, and therefore, the description of the inserting lock 36a will be given without the detailed illustration thereof by referring to the inserting lock 36b shown in FIG. 1 with identical reference numerals assigned thereto.

Slide ribs 38 and 38 having a T-shaped cross section and extending parallel to each other are formed on the inserting lock 36a. The separation distance between the slide ribs 38 and 38 is substantially equal to the separation distance between the slots 28 and 28 of the receiving lock 24a. Also, a lock pawl 40 is formed between the slide ribs 38 and 38 in an intermediate portion in the direction of extension of the slide ribs 38 and 38. Additionally, slot-shaped punched holes 42 and 42 extending in the direction of extension of the slide ribs 38 and 38 are provided on opposite sides of the lock pawl 40. Thereby, the area where the lock pawl 40 is formed can easily undergo bending deformation, and thus the lock pawl 40 can easily pass over the lock wall portion 30 of the receiving lock 24a during mounting.

Figure 3:
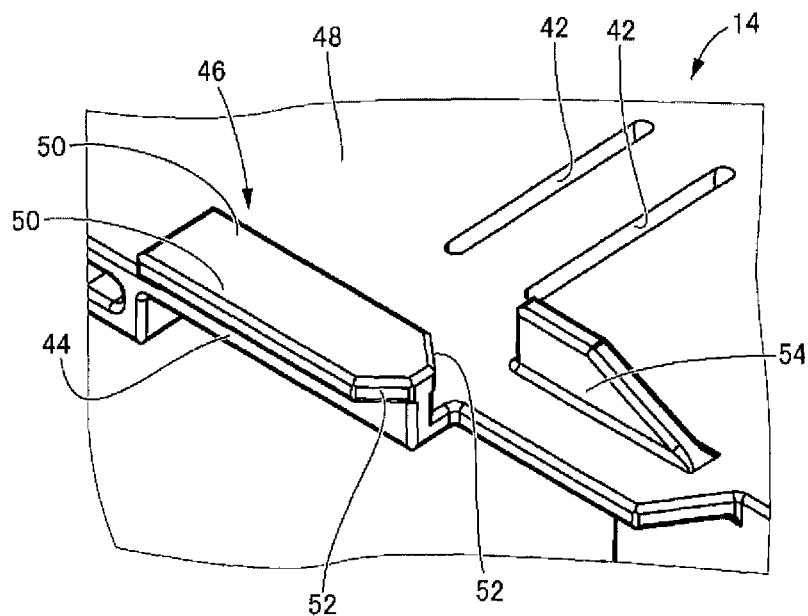
FIG. 3 is an enlarged perspective view of relevant portions of an upper fixing member.

As shown in FIG. 3 in enlargement, an engaging guide rib 46 as an engaging guide portion is formed at an edge portion 44 of the upper fixing member 14 located toward the front surface 21 in a state in which the upper fixing member 14 is fixed to the box body 12. The engaging guide rib 46 protrudes upwardly from an outer face 48 of the upper fixing member 14, and extends with a substantially T-shaped cross section, with locking portions 50 that extend in opposite directions orthogonal to the direction of protrusion from the outer face 48 and the direction of extension of the engaging guide rib 46 being formed at the protruding end of the engaging guide rib 46. Additionally, a taper 52 is formed at an edge portion of each locking portion 50 that is on the side where engagement with an engaging guide groove 80, which will be described later, is started.

Further, an auxiliary guide wall 54 is formed so as to protrude from the outer face 48 of the upper fixing member 14. The auxiliary guide wall 54 is formed on the outer face 48 on the inward side of the engaging guide rib 46 and toward the connector holder 18 (in FIG. 2, the right side) relative to the engaging guide rib 46. An edge portion of the auxiliary guide wall 54 located toward the connector holder 18 is tapered such that the dimension of protrusion from the outer face 48 gradually increases toward the engaging guide rib 46.

Meanwhile, as shown in FIGS. 1 and 2, the lower fixing member 16 is an integrally molded, synthetic resin unit formed separately from the box body 12. The lower fixing member 16 has a substantially arch shape in which a pair of leg portions 58a and 58b each including a bolt fixing portion 56 having a bolt hole extending therethrough are coupled by a coupling portion 60. The coupling portion 60 is formed so as to protrude upwardly, and includes an inserting lock 36b formed on the inner surface of its upwardly protruding portion.

Figure 4:
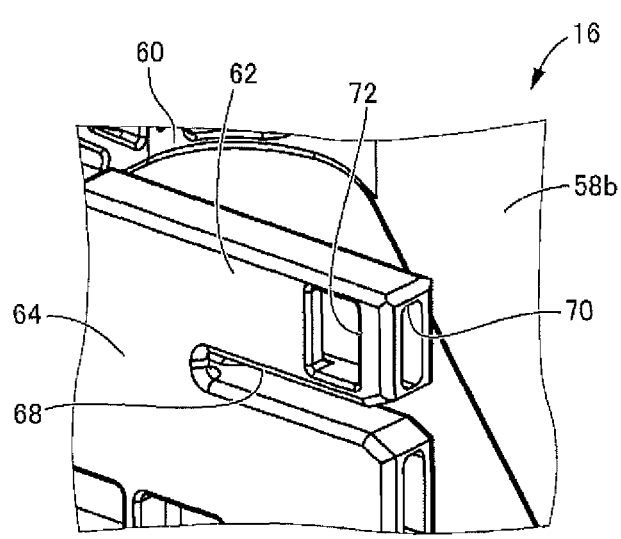
FIG. 4 is an enlarged perspective view of relevant portions of a lower fixing member.

Furthermore, an insertion protruding portion 62 is formed at the leg portion 58a located toward the front surface 21 of the box body 12 in the state in which it is mounted on the box body 12. The insertion protruding portion 62 is formed by dividing a plate-shaped portion 64 protruding from the leg portion 58a by a slot 68. As shown in FIG. 4 in enlargement, the insertion protruding portion 62 has the shape of a hollow rectangular plate having a thickness reducing hole 70. At a distal end portion of the insertion protruding portion 62, a rectangular engaging hole 72 is provided so as to penetrate the outer surface of the lower fixing member 16. Additionally, the opening end portion of the slot 68 is expanded with a taper 74 formed thereon, facilitating insertion of an insertion recessed portion 86, which will be described later.

Meanwhile, as shown in FIG. 5, the connector holder 18 is an integrally molded, synthetic resin unit formed separately from the box body 12. The connector holder 18 is an elongated member having a length dimension spanning across substantially the entire length of the box body 12. A body portion 75 of the connector holder 18 has the shape of a block in which a plurality of (in the present embodiment, three) connector housing portions 76 formed so as to be arranged in the longitudinal direction (in FIG. 5, the up-down direction).

The connector holder 18 includes, at its upper end portion, a protruding tube portion 78 extending so as to protrude toward the box body 12 in a direction orthogonal to the longitudinal direction (in FIG. 2, the up-down direction) of the connector holder 18. As shown in FIG. 6, an engaging guide groove 80 as one set of the fitting portions is formed in the interior of the protruding tube portion 78. The engaging guide groove 80 extends with a substantially T-shaped cross section corresponding to the engaging guide rib 46 formed on the upper fixing member 14. Additionally, a lateral opening 82 that is open toward the box body 12 is formed in the engaging guide groove 80 at a portion extending in the up-down direction of the T-shape.

Further, a doubler portion 84 is formed on the connector holder 18. The doubler portion 84 has the shape of a plate protruding in the same direction as the protruding tube portion 78, and is formed so as to protrude from a side wall of the body portion 75 that is located toward the box body 12.

Furthermore, an insertion recessed portion 86 as a lock portion as one set of the fitting portions is formed at a lower end portion of the connector holder 18. As shown in FIG. 7, the insertion recessed portion 86 has the shape of a substantially rectangular tube as a whole. The insertion recessed portion 86 is coupled to the body portion 75 by a downwardly extending portion 88 extending downwardly at the doubler portion 84 and a plate-shaped connecting plate portion 90 extending downwardly from the body portion 75, and is located below the body portion 75 toward the box body 12 relative to the body portion 75 and the protruding tube portion 78.

The direction of extension of the tubular shape of the insertion recessed portion 86 coincides with the direction of extension of the engaging guide groove 80. A lock piece 94 is formed on a side wall 92 of the insertion recessed portion 86. The lock piece 94 has the shape of an elastically deformable plate spring extending toward a rear edge 96 of the insertion tube portion 86 and having a free end on the rear edge 96 side. A lock pawl 98 protruding toward the inside of the insertion recessed portion 86 is formed at an end portion of the lock piece 94 on the rear edge 96 side.

Furthermore, a pair of elastically flexible walls 100 and 100 as a tolerance absorbing device are formed at the insertion recessed portion 86. The elastically flexible walls 100 and 100 are formed integrally with the insertion recessed portion 86 by cutting the upper wall and the lower wall of the insertion recessed portion 86 at portions located toward the rear edge 96 to the inside of the insertion recessed portion 86. Consequently, the elastically flexible walls 100 and 100 extend closer to the inside of the insertion recessed portion 86 to come closer to each other as they approach the rear edge 96, and have the shape of a plate spring having a free end on the rear edge 96 side.

Then, as shown in FIG. 2, the upper fixing member 14 and the lower fixing member 16 are attached to the box body 12. The upper fixing member 14 is attached to the box body 12 by the slide ribs 38 and 38 (see the inserting lock 36b in FIG. 1) of the inserting lock 36a being inserted into the slots 28 and 28 of the guide tube portions 26 and 26 of the receiving lock 24a of the box body 12 and slidingly moved, and the lock pawl 40 moving over and being engaged with the lock wall portion 30. Also, the lower fixing member 16 is attached to the box body 12 by the inserting lock 36b of the lower fixing member 16 being engaged with the receiving lock 24b of the box body 12 in the same manner. Thus, the upper fixing member 14 and the lower fixing member 16 are positioned diagonally across from each other on the box body 12 and attached on opposite sides sandwiching the box body 12 in the longitudinal direction (in FIG. 2, the up-down direction).

As a result of the upper fixing member 14 being placed on top of the upper wall 22 of the box body 12 and being attached thereto, the outer face 48 of the upper fixing member 14 as a part of the upper wall surface of the box body 12. Then, as a result of the engaging guide rib 46 being provided on the wall surface of the box body 12, the engaging guide rib 46 as one set of the fitting portions of the box body 12. Also, the insertion protruding portion 62 is provided on the box body 12 as a result of the lower fixing member 16 being attached to the box body 12, and the insertion protruding portion 62 as a lock portion as one of the fitting portions of the box body 12. Then, the engaging guide rib 46 is disposed on the upper side of the box body 12 in the longitudinal direction, and the insertion protruding portion 62 is disposed on the lower side of the box body 12 in the longitudinal direction.

The engaging guide rib 46 and the insertion protruding portion 62 extend in the shorter direction (in FIG. 2, the left-right direction) of the box body 12, which is a direction in which the connector holder 18 is fitted to the box body 12. The engaging guide rib 46 and the insertion protruding portion 62 are disposed at positions that are offset in the shorter direction of the box body 12, and the engaging guide rib 46 is located toward the connector holder 18 (FIG. 2, the right side) relative to the insertion protruding portion 62. The distance: Lb between the edge portion of the engaging guide rib 46 on the connector holder 18 side and the edge portion of the insertion protruding portion 62 on the connector holder 18 side in the direction in which the connector holder 18 is fitted to the box body 12 is larger than the distance: Lh between the edge portion of the engaging guide groove 80 in the connector holder 18 on the box body 12 side and the edge portion of the insertion recessed portion 86 on the box body 12 side in the direction in which the connector holder 18 is fitted to the box body 12. Preferably, the difference between the distance: Lb between the edge portion of the engaging guide rib 46 and the edge portion of the insertion protruding portion 62 and the distance: Lh between the edge portion of the engaging guide groove 80 and the edge portion of the insertion recessed portion 86 is set to be greater than or equal to ⅓ of the length dimension: L of the engaging guide rib 46. Accordingly, the insertion of the insertion protruding portion 62 into the insertion recessed portion 86 is started at the stage at which the engaging guide groove 80 is fitted to a length dimension greater than or equal to ⅓ of the length dimension: L of the engaging guide rib 46. More preferably, the difference between the distance: Lb and the distance: Lh is set to be greater than or equal to ½ of L. In the present embodiment, the difference is set to be greater than or equal to ½ of L. Consequently, the insertion of the insertion protruding portion 62 into the insertion recessed portion 86 is started at the stage at which the engaging guide groove 80 is fitted to a length dimension greater than or equal to ½ of the length dimension: L of the engaging guide rib 46.

Figure 8A:
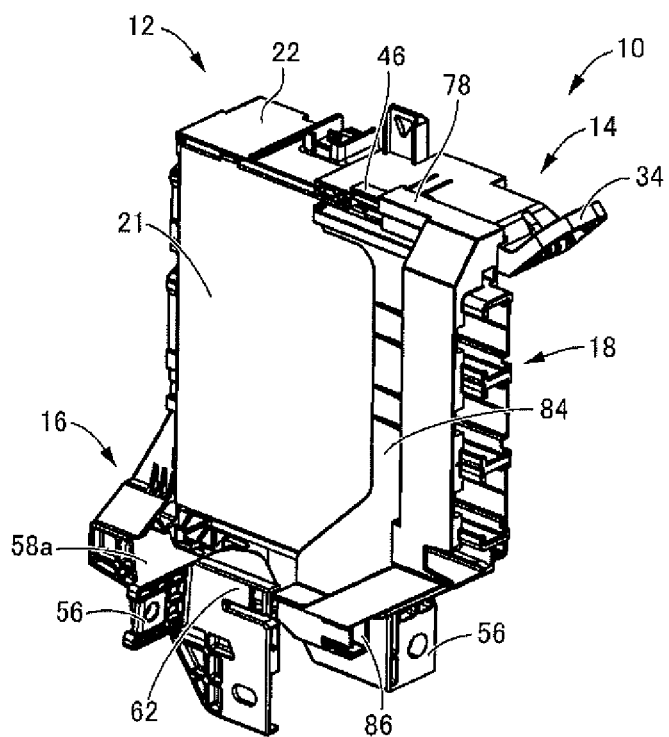
FIG. 8(*a*) is a perspective view showing a state in which the connector holder is being mounted onto the box body.
FIG. 8(b) is a perspective view showing a state in which the mounting of the connector holder onto the box body is completed.
Figure 8B:
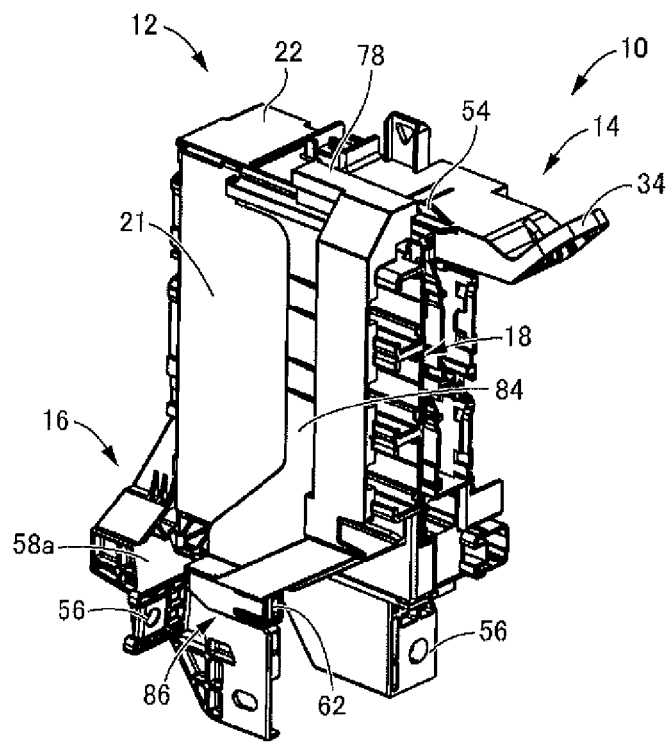

Then, as shown in FIG. 8, the connector holder 18 is attached to the box body 12 to which the upper fixing member 14 and the lower fixing member 16 have been attached. The connector holder 18 is slidingly moved toward the box body 12 in the shorter direction (in FIG. 2, the left-right direction) of the box body 12, with the doubler portion 84 being placed on top of the front surface 21 of the box body 12. Then, the engaging guide rib 46 is inserted into the engaging guide groove 80 before the insertion protruding portion 62 is inserted into the insertion recessed portion 86. Note that the protruding tube portion 78 is guided by the auxiliary guide wall 54 since the auxiliary guide wall 54 (see e.g., FIG. 3) is formed at the front of the engaging guide rib 46 in the direction of fitting of the connector holder 18, and the engaging guide groove 80 can be smoothly inserted since the taper 52 is formed at the distal end of the engaging guide rib 46.

Figure 9A:
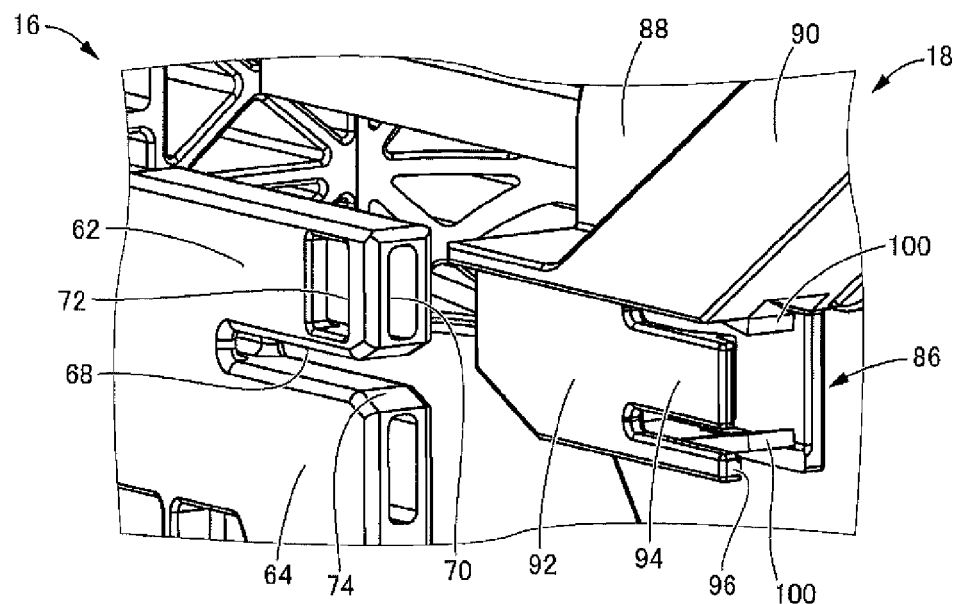
FIG. 9(a) is a perspective view showing a state in which an insertion protruding portion and an insertion recessed portion are positioned relative to each other.
Figure 9B:
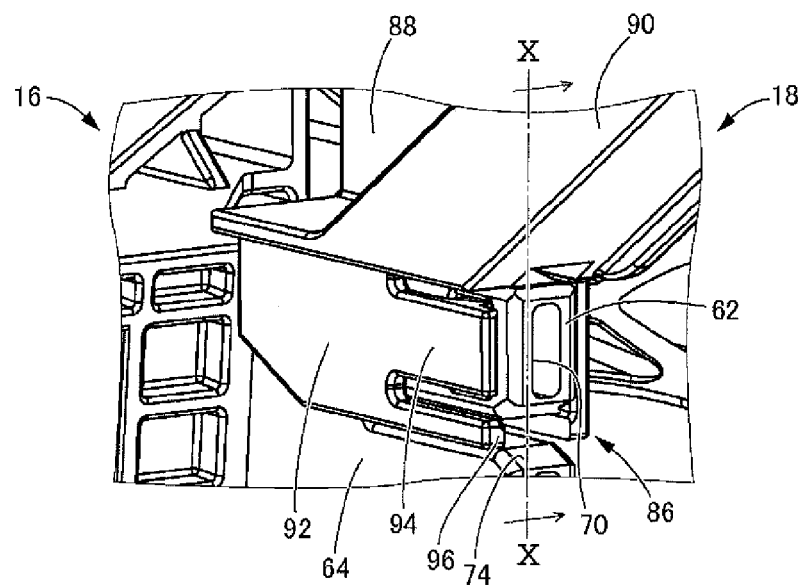
FIG. 9(b) is a perspective view showing a state in which the insertion protruding portion and the insertion recessed portion are locked.
Figure 10:
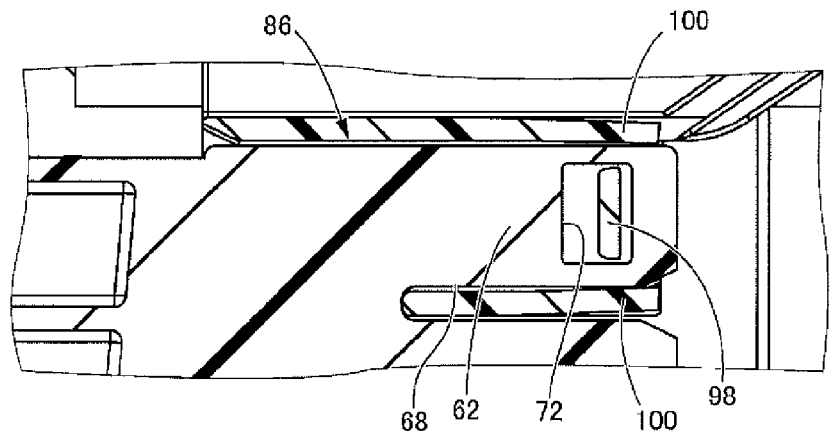
FIG. 10 is an enlarged view of relevant portions in a cross section taken along the arrows X-X in FIG. 9(b).

As a result of the engaging guide rib 46 and the engaging guide groove 80 being engaged with each other by insertion of the engaging guide rib 46 into the engaging guide groove 80, the connector holder 18 is positioned relative to the box body 12, and the insertion protruding portion 62 and the insertion recessed portion 86 are positioned relative to each other as shown in FIG. 9(*a*). Then, the connector holder 18 is guided by the engaging guide rib 46 and the engaging guide groove 80 in the direction (in FIG. 2, the left-right direction) of protrusion of the insertion protruding portion 62 while being brought further closer to the box body 12. Thereby, the insertion protruding portion 62 is inserted into the insertion recessed portion 86 as shown in FIG. 9(*b*). As shown in FIG. 10, the insertion protruding portion 62 pushes the elastically flexible walls 100 and 100 apart while being inserted into the insertion recessed portion 86, causing the lock pawl 98 to be engaged with the engaging hole 72. Consequently, the insertion protruding portion 62 and the insertion recessed portion 86 are engaged with each other. As a result, as shown in FIG. 8(*b*), the connector holder 18 is fixed above the box body 12 by engagement between the engaging guide rib 46 and the engaging guide groove 80, and is also fixed below the box body 12 by engagement between the insertion protruding portion 62 and the insertion recessed portion 86. Accordingly, the connector holder 18 is attached so as to straddle the upper fixing member 14 and the lower fixing member 16, and is also attached to the box body 12 via the upper fixing member 14 and the lower fixing member 16.

In the electrical junction box 10 having a structure according to the present embodiment, by the insertion of the insertion protruding portion 62 into the insertion recessed portion 86, the elastically flexible walls 100 and 100 provided within the insertion recessed portion 86 are pressed by the insertion protruding portion 62, and are elastically deformed in a direction (in FIG. 10, the up-down direction) orthogonal to the insertion direction (in FIG. 10, the left-right direction) of the insertion protruding portion 62. Accordingly, variations in the positions of the insertion protruding portion 62 relative to the insertion recessed portion 86 can be absorbed by the elastically flexible walls 100 and 100, making it possible to stably support the insertion protruding portion 62 within the insertion recessed portion 86. As a result, it is possible to mount the connector holder 18 onto the box body 12 without rattling, thus preventing the generation of an unusual sound due to rattling.

In particular, in the present embodiment, the connector holder 18 is attached to the upper fixing member 14 and the lower fixing member 16 attached on opposite longitudinal sides of the box body 12. Therefore, there is the possibility that the tolerances of the box body 12, the upper fixing member 14 and the lower fixing member 16, and the connector holder 18 accumulate, resulting in larger variations in the positions of the insertion protruding portion 62 and the insertion recessed portion 86. However, the provision of the elastically flexible walls 100 and 100 to the insertion recessed portion 86 makes it possible to effectively absorb the accumulated tolerances, thus enabling the connector holder 18 to be stably attached to the box body 12.

In addition, the elastically flexible walls 100 and 100 are formed on opposite sides sandwiching the insertion protruding portion 62 from above and below. For example, when one elastically flexible wall 100 is formed only at a lower portion of the insertion recessed portion 86 and the insertion protruding portion 62 is biased to the lower portion of the insertion recessed portion 86, there is the possibility that the amount of deformation of the elastically flexible wall 100 increases, resulting in an increase in the force inserting the insertion recessed portion 86. However, according to the present embodiment, the elastically flexible walls 100 and 100 are formed at both the upper and lower portions of the insertion recessed portion 86, and therefore, it is possible to suppress the increase in the insertion force even when the insertion protruding portion 62 is biased in one of the upward and downward directions and to facilitate the insertion. However, the elastically flexible wall 100 may be formed at only one of the upper or lower portion of the insertion recessed portion 86. Furthermore, the elastically flexible walls 100 and 100 are integrally formed using the wall portions of the insertion recessed portion 86, and it is therefore possible to stably support the insertion protruding portion 62 by achieving surface contact with the insertion protruding portion 62, and to obtain the tolerance absorbing device at low cost.

Also, the engagement of the engaging guide rib 46 of the box body 12 with the engaging guide groove 80 of the connector holder 18 enables the connector holder 18 to be guided in the direction of insertion of the insertion protruding portion 62 into the insertion recessed portion 86, and therefore, mounting can be performed more easily. In particular, the engaging guide rib 46 and the engaging guide groove 80 are engaged before the insertion protruding portion 62 is inserted into the insertion recessed portion 86. This makes is possible to insert the insertion protruding portion 62 in alignment with the insertion recessed portion 86, further facilitating the mounting operation of the connector holder 18.

Furthermore, as shown in FIG. 6, the engaging guide rib 46 is T-shaped such that the locking portions 50 and 50 protrude in opposite directions orthogonal to the mounting direction. Accordingly, the engaging guide groove 80 is locked by the locking portions 50 and 50, and thereby, it is possible to prevent the connector holder 18 from being detached upward (in FIG. 6, above), thus enabling the connector holder 18 to be positioned in the up-down direction. In addition, the engaging guide groove 80 is locked by a portion of the engaging guide rib 46 that extends in the up-down direction, and thereby, it is also possible to position the connector holder 18 in the left-right direction (in FIG. 6, the left-right direction) relative to the mounting direction. Thus, it is possible to position the connector holder 18 in both the up-down direction (FIG. 6, the up-down direction) and the left-right direction (in FIG. 6, the left-right direction) relative to the mounting direction, thus enabling the connector holder 18 to be more stably guided in the mounting direction, and achieving more stable alignment between the insertion protruding portion 62 and the insertion recessed portion 86.

In addition, the insertion protruding portion 62 and the insertion recessed portion 86 are inserted after the engaging guide rib 46 and the engaging guide groove 80 are engaged to a length dimension greater than or equal to ½ of the length dimension of the engaging guide rib 46. Accordingly, the insertion protruding portion 62 is inserted into the insertion recessed portion 86 at the stage at which the engaging guide rib 46 and the engaging guide groove 80 are engaged by a predetermined amount and the positioning of the connector holder 18 is stabled, and it is therefore possible to insert the insertion protruding portion 62 into the insertion recessed portion 86 more easily and smoothly.

Figure 11:
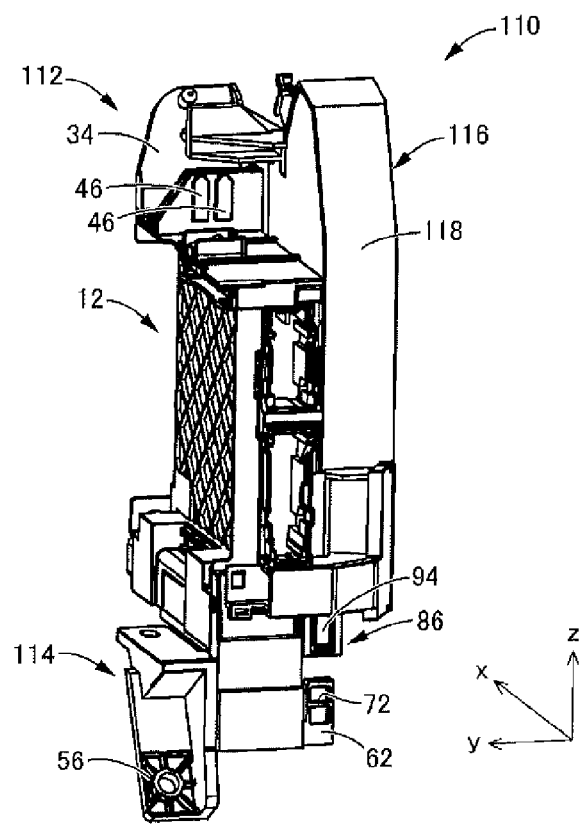
FIG. 11 is a perspective view showing a state in which an electrical junction box as a second embodiment of the present disclosure is being assembled.
Figure 12:
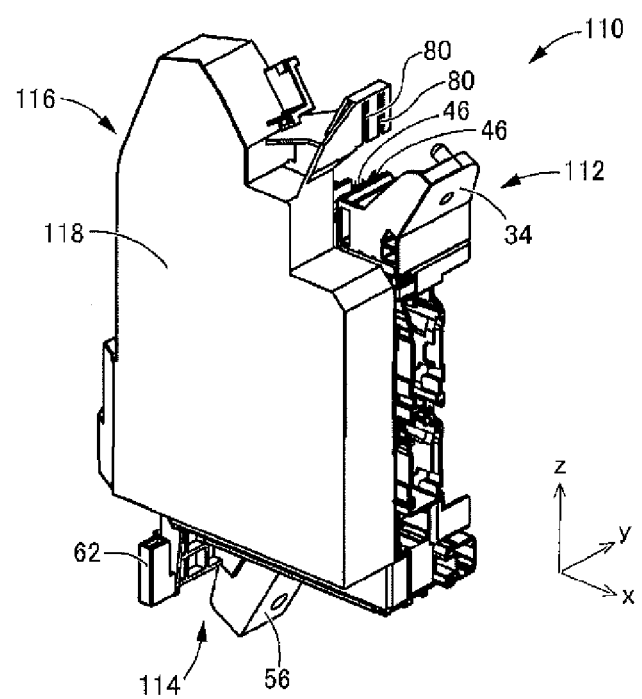
FIG. 12 is a perspective view showing a state in which the electrical junction box shown in FIG. 11 is being assembled, as viewed in a direction different from the direction in FIG. 1.
Figure 13:
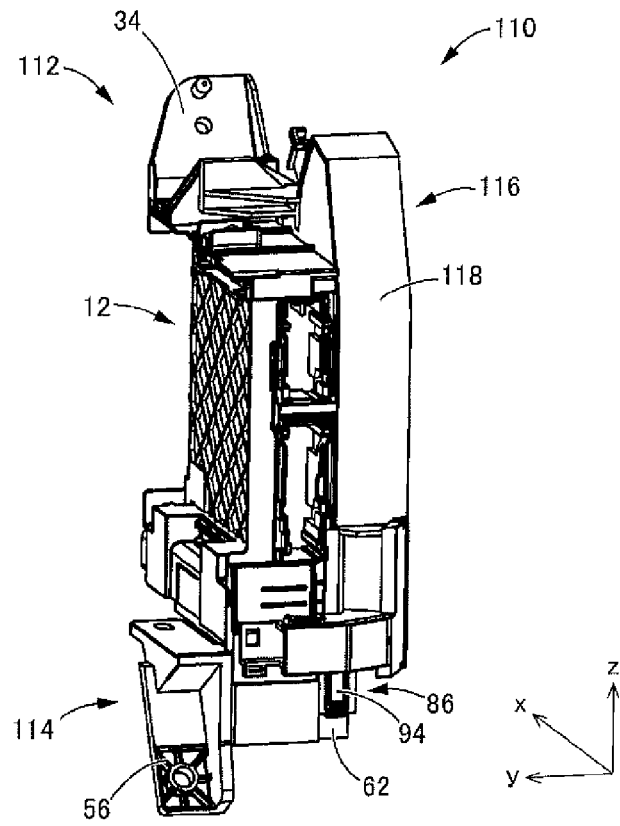
FIG. 13 is a perspective view showing a state in which the electrical junction box shown in FIG. 11 is assembled.

Next, an electrical junction box 110 as a second embodiment of the present disclosure is shown in FIGS. 11 to 13. The electrical junction box 110 of the present embodiment is configured by mounting, onto the box body 12 described in the first embodiment, an upper fixing member 112 and a lower fixing member 114 as vehicle fixing members having different shapes from those of the first embodiment, and a circuit unit 116 as an external member. In the following description, portions having the same structure as the first embodiment are denoted by identical reference numerals as the first embodiment in the drawings, and the description thereof has been omitted.

As with the first embodiment, the upper fixing member 112 and the lower fixing member 114 are mounted to receiving locks 24a and 24b (see FIG. 1), respectively, of the box body 12, are positioned diagonally across from each other on the box body 12, and are disposed on opposite sides sandwiching the box body 12 in the longitudinal direction. Two engaging guide ribs 46 and 46 extending in the up-down direction are formed side by side on the upper fixing member 112. On the other hand, an insertion protruding portion 62 extending upwardly is formed in the lower fixing member 114. The engaging guide ribs 46 and 46 and the insertion protruding portion 62 have substantially the same shapes as those of the first embodiment, except that the direction of their extension is set to the up-down direction.

The circuit unit 116 is an electrical junction box in which an electrical circuit (not shown) is provided in the interior of a case 118. The circuit unit 116 is a large member that overlaps substantially the entire front surface 21 of the box body 12. Also, as shown in FIG. 12, slot-shaped engaging guide grooves 80 and 80 extending in the up-down direction are formed integrally with the case 118 of the circuit unit 116 at positions overlapping engaging guide ribs 46 and 46. As shown in FIG. 11, an insertion recessed portion 86 that is open downwardly and extends in the up-down direction is formed integrally with the case 118 in a position corresponding to the insertion protruding portion 62. Although not clearly seen from the drawings, the insertion recessed portion 86 of the present embodiment has substantially the same structure as the insertion recessed portion 86 of the first embodiment, and a pair of elastically flexible walls 100 and 100 as a tolerance absorbing device are formed integrally with the interior of the insertion recessed portion 86. Accordingly, the elastically flexible walls 100 and 100 of the present embodiment face each other in the thickness direction (in FIG. 11, y-direction), which is orthogonal to the vertical up-down direction (in FIG. 11, z-direction), of the box body 12.

The circuit unit 116 of the present embodiment is mounted onto the box body 12 by being slid in the vertical up-down direction, which is the longitudinal direction of the box body 12. With the circuit unit 116, the case 118 is placed on top of the front surface 21 of the box body 12, and the engaging guide grooves 80 and 80 are engaged with the engaging guide ribs 46 and 46 of the box body 12. Note that the insertion protruding portion 62 is configured not to be inserted into the insertion recessed portion 86 at the time when the engagement of the engaging guide ribs 46 and 46 with the engaging guide grooves 80 and 80 is started. Then, the engagement of the engaging guide ribs 46 and 46 with the engaging guide grooves 80 and 80 causes the insertion protruding portion 62 and the insertion recessed portion 86 to be positioned relative to each other, and also causes the circuit unit 116 to be guided vertically downward by the guiding function of the engaging guide ribs 46 and 46 and the engaging guide grooves 80 and 80, and thereby, the insertion protruding portion 62 is inserted into the insertion recessed portion 86. Consequently, the lock pawl 98 of the insertion recessed portion 86 is engaged with the engaging hole 72 of the insertion protruding portion 62, and the insertion protruding portion 62 and the insertion recessed portion 86 are engaged with each other. Thus, the circuit unit 116 is attached to the upper fixing member 112 and the lower fixing member 114, and also attached to the box body 12 via the upper fixing member 112 and the lower fixing member 114.

In the present embodiment as well, as with the first embodiment, the insertion of the insertion protruding portion 62 into the insertion recessed portion 86 causes the elastically flexible walls 100 and 100 to be pushed apart by the insertion protruding portion 62, and thereby, the tolerances of the box body 12, the upper fixing member 112, and the lower fixing member 114 are absorbed. As is apparent from the present embodiment, the mounting direction of the external member (in the present embodiment, the circuit unit 116) onto the box body 12 is not limited, and the directions of extension of the engaging guide ribs 46 and 46 and the engaging guide grooves 80 and 80 and the directions of extension of the insertion protruding portion 62 and the insertion recessed portion 86 may be changed as appropriate according to the mounting direction of the external member. In addition, the external member may be an electrical junction box or the like, such as the circuit unit 116.

Although embodiments of the present disclosure have been described above in detail, the disclosure is not intended to be limited by the specific description thereof. For example, only one of the pair of elastically flexible walls 100 and 100 in the above-described embodiments may be formed as the tolerance absorbing device, or the tolerance absorbing device may be configured with a separate elastic member such as a rubber elastomer or a metal spring.

The cross-sectional shapes of the engaging guide rib and the engaging guide groove are not limited to a T-shape as described in the embodiments, and it is possible to use various cross-sectional shapes, including, for example, a cross-shaped cross section, and an inverted triangular cross section that expands in the direction of protrusion from the box body or the external member.

Although the engaging guide rib 46 and the insertion protruding portion 62 are provided in the upper fixing member 14 and the lower fixing member 16 that are formed separately from the box body 12 in the above-described embodiments, the engaging guide rib 46 and the insertion protruding portion 62 may be formed integrally with the case 20 of the box body 12.

Furthermore, the external member that is mounted on the box body is not limited to the connector holder and the circuit unit described in the embodiments, but may be, for example, a relay box or the like, or any of various types of electrical junction boxes. The external member may be a vehicle fixing member including a fixing portion to a vehicle. For example, a vehicle fixing member may be further mounted as an external member onto the upper fixing member 14 and the lower fixing member 16 as the vehicle fixing members described in the first embodiment.

The invention claimed is:

1. An electrical junction box configured such that an external member formed separately from a box body is mounted on the box body with fitting portions provided at a plurality of locations, wherein:
   as one set of the fitting portions provided at the plurality of locations, lock portions for being engaged with each other are formed in the box body and the external member, respectively;
   as one set of the fitting portions provided at the plurality of locations, an engaging guide rib is formed in one of the box body and the external member, the engaging guide rib protruding from a wall surface of the box body or the external member so as to extend in a direction in which the external member is fitted to the box body and including locking portions that extend in opposite directions orthogonal to a direction of extension of the engaging guide rib, and an engaging guide groove for being engaged with the engaging guide rib is formed in the other of the box body and the external member;
   the lock portions are engaged after the engaging guide rib and the engaging guide groove are engaged; and
   the lock portions are spaced from and separate from the engaging guide rib and the engaging guide groove.

2. The electrical junction box according to claim 1, wherein the fitting portions in the box body are provided in a vehicle fixing member that is formed separately from the box body and that is mounted to the box body.

3. The electrical junction box according to claim 1, wherein the box body has a longitudinal shape, and the engaging guide rib or the engaging guide groove is provided on one side in a longitudinal direction of the box body, and the lock portions are provided on another side in the longitudinal direction of the box body.

4. The electrical junction box according to claim 1, wherein the lock portions are engaged after the engaging guide groove is fitted to a length dimension greater than or equal to ⅓ of a length dimension of the engaging guide rib.

5. The electrical junction box according to claim 1, wherein the lock portions include an insertion protruding portion provided in one of the box body and the external member, and an insertion recessed portion provided in the other of the box body and the external member, the insertion recessed portion being configured such that the insertion protruding portion is inserted thereinto and engaged therewith,
   the insertion recessed portion is provided with a tolerance absorbing device configured to be pressed by the insertion protruding portion and be elastically deformable in a direction orthogonal to a direction in which the insertion protruding portion is inserted, and
   the insertion protruding portion is inserted into the insertion recessed portion after the engaging guide rib and the engaging guide groove are engaged.

* * * * *